June 22, 1965 R. A. PENDLETON 3,189,928

APPARATUS FOR VACUUM CLEANING A RECORD TAPE

Filed Feb. 26, 1962

2 Sheets-Sheet 1

INVENTOR.
ROBERT A. PENDLETON

BY [signature]

ATTORNEY

INVENTOR.
ROBERT A. PENDLETON
BY Henry L. Hanson
ATTORNEY

United States Patent Office
3,189,928
Patented June 22, 1965

3,189,928
APPARATUS FOR VACUUM CLEANING A RECORD TAPE

Robert A. Pendleton, Dedham, Mass., assignor to Honeywell Inc., a corporation of Delaware
Filed Feb. 26, 1962, Ser. No. 175,665
2 Claims. (Cl. 15—306)

A general object of the present invention is to provide a new and improved apparatus useful in the cleaning of a data storage tape. More specifically, the present invention is concerned with a new and improved vacuum cleaning apparatus for a data storage tape which is characterized by its ability to effect optimum cleaning of unwanted particles from an associated data storage tape without producing any adverse wearing effects on the tape.

Data storage tapes are widely used for storing digital data which may be used in conjunction with electronic data processing systems or other similar apparatus. A typical form of data storage tape is a plastic-base tape having formed thereon a suitable coating of magnetic oxide in a binder. Electro-magnetic reading heads are adapted to be positioned adjacent the tape so as to cause a change in the residual flux condition of the magnetic oxide on the tape, or to read or sense the residual flux conditions already on the tape.

In electronic data processing systems in particular, there is a need for large amounts of digital data to be stored in the record tape in relatively small areas. The number of pulses stored along a given length of tape in a particular channel or track is sometimes referred to as the pulse-packing density. When recording is carried out with a high-pulse packing density which may, for example, vary between 450 bits per inch up to 1500 bits per inch and over, one of the limiting factors in achieving the necessary resolution in the reading and writing with respect to such tape is the amount of accumulated dust and unwanted particles that may collect on the surface of the tape. The presence of any dust or particles may cause an unwanted displacement of the data transfer head with respect to the tape and the consequent loss of information therefrom. The effective removal of all such dust and particles thus becomes important in achieving satisfactory operation of such apparatus.

It is accordingly a further object of the present invention to provide a new and improved apparatus useful in vacuum-cleaning a data storage tape.

The ability to remove the unwanted particles including dust and the like from the surface of the tape serves not only to eliminate signal drop-out as the tape is passed under the associated data transfer head, but is also useful in preventing the dust on the surface of the tape from being carried by the tape onto any supply and take-up reels associated with the transfer mechanism where this dust and similar particles can become inbedded in the surface of the tape to thereby lessen the usefulness of the tape surface. Further, since many tape mechanisms take the form of apparatus for driving the tape in either a forward or a reverse direction with respect to a supply and a take-up reel, it is essential that the vacuum-cleaning arrangement be set up so that, no matter which reel is serving as the take-up reel or the supply reel, the cleaning operation will be performed relative to the tape in a uniform manner to give optimum protection against the unwanted dust and particles on the surface of the tape. Consequently, it is necessary that the cleaning mechanism of the apparatus function equally well whether the tape is moving in the forward or in the reverse direction. It is also necessary that the cleaning apparatus be positioned relative to the tape so as to provide optimum cleaning without introducing any abrading effects on the tape as it is performing its cleaning function.

It is therefore a still further more specific object of the invention to provide a new and improved cleaning apparatus which comprises a vacuum-cleaning member comprising a head positioned immediately adjacent to a data storage tape, but spaced therefrom, with the cleaning head functioning equally well irrespective of whether the tape is moving in a forward or a reverse direction past the head.

Still another more specific object of the present invention is to provide a new and improved vacuum head for a data storage tape which has an arcuate surface with a pair of longitudinal slots cut therein extending across the path of travel of the tape and with the land between the slots positioned to serve as a mechanical buffer to prevent the tape from moving adjacent the slots to thereby prevent any sealing off of the cleaning slots due to any flexing of the tape.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
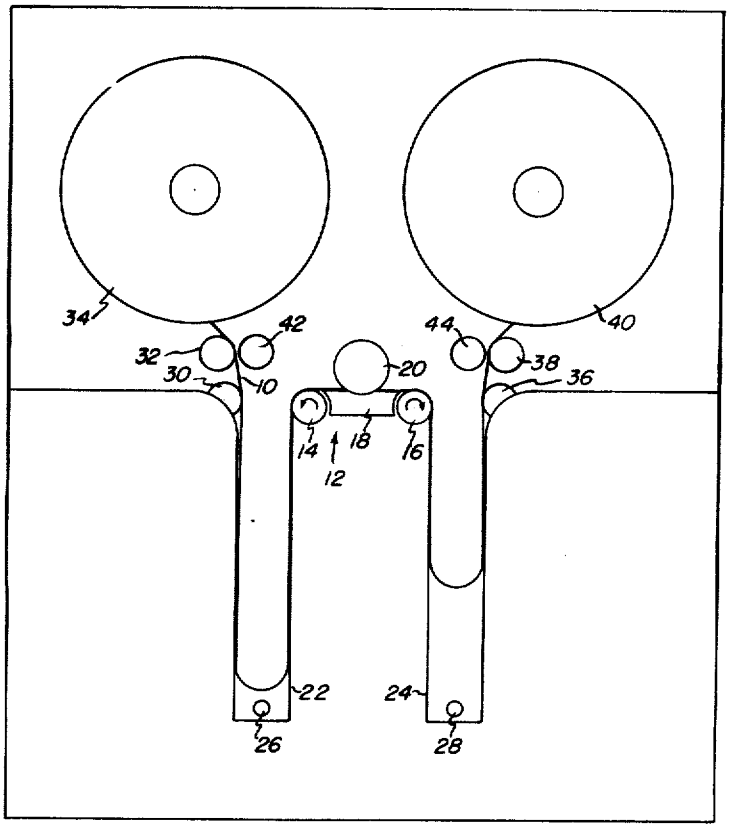
FIGURE 1 is a diagrammatic representation of the invention applied to a data storage tape transport apparatus.

The apparatus shown in FIGURE 1 is a representative type of tape transport which may conveniently use the principles and teachings of the present invention. This tape transport is one capable of driving a tape in either a forward or reverse direction past a data transfer head with the tape being supplied by way of a supply reel and taken up upon a take-up reel. The cleaning apparatus, as more fully explained below, is utilized in cleaning the tape regardless of the direction in which the tape may be moving.

Considering FIGURE 1 more specifically, the numeral 10 identifies a data storage tape which may well be a plastic-base tape having formed on the surface thereof a suitable magnetic material for data storing purposes.

The tape 10 is adapted to be moved in a forward or in a reverse direction by way of a pneumatic motion-controlling apparatus indicated generally at 12. In a preferred embodiment of the invention, the apparatus 12 comprises a pair of penumatic capstans 14 and 16 which are adapted to be reversibly driven with respect to each other. These capstans may be selectively activated with a vacuum signal by switching means, not shown, so as to move the tape against the capstan to grip the tape 10 and cause it to move in one direction or the other. A pneumatic or vacuum brake 18 is positioned between the two capstans 14 and 16 and is arranged to apply a vacuum to stop the motion of the tape when it is not being driven by either the capstan 14 or the capstan 16. The tape 10 when driven by the apparatus 12 is adapted to be moved past a data transfer head 20. The apparatus discussed thus far may well be of the type which is more specifically described in a patent of the present inventor bearing No. 2,866,637.

Positioned on either side of the tape-moving apparatus 12 are a pair of loop chambers 22 and 24. These loop chambers provide a certain amount of slack tape on either side of the tape-moving apparatus 12 so as to ensure that the tape may be started and stopped rapidly with a minimum amount of tape mass being involved in any rapid tape starting and stopping by way of the apparatus 12. Positioned on the bottom of each of the loop chambers 22 and 24 are openings 26 and 28 respectively. These openings serve to couple a vacuum or subatmospheric pressure to the lower portion of the chambers to thereby tend to pull the tape down into the chambers and maintain the tape under tension.

Positioned on the outer side of the chamber 22 is a roller 30 which serves in the guiding of the tape 10 as it leaves the chamber 22 or as it is fed into the chamber 22. A further idling guide roller 32 is provided and the tape 10 is also adapted to pass over the peripheral surface of this roller as it is being fed from or fed onto the associated reel 34.

Associated with the outer side of the loop chamber 24 is a further guide roller 36 which cooperates with a further idler roller 38 to control the feeding of the tape relative to a further reel 40.

Positioned adjacent the tape 10 between the rollers 30 and 32 is a vacuum cleaning head 42. Positioned between the rollers 36 and 38, adjacent to the tape 10, is a further vacuum head 44.

In considering the operation of the apparatus of FIGURE 1, the tape-moving apparatus 12 is adapted to have a vacuum coupled to one or the other of the capstans 14 or 16 so as to cause the tape 10 to be driven past the data transfer head 20. When such an apparatus is utilized with a data processing system, the reading and writing of information with respect to the tape is generally accomplished in limited lengths of the tape each separated by a small space. The areas where the data transfer takes place may be referred to as records or record blocks. The starting and stopping of the tape, in order to effect the desired data transfer, is accomplished with very high accelerations and decelerations, and in very short time intervals which may be on the order of 2 to 3 milliseconds. These rapid accelerations and decelerations of the tape cause a certain amount of plastic dust to be generated and this dust tends to accumulate on the tape 10 where, if allowed to continue for a long enough period of time, the dust can build up sufficiently to cause signal drop-outs or loss of information. Unwanted airborne particles or dust due to the tape-slitting process may also appear on the tape and, if not removed, may cause signal loss or drop-out.

As the tape is moved in one direction or the other past the data transfer head 20, the tape will either be pulled out of or fed into one or the other of the loop chambers 22 or 24. As the tape loop within either of the chambers 22 or 24 tends to drop toward the bottom of the chamber, sensing means not shown, sense the depth to which the tape has gone into the chamber and there is a resultant driving signal produced which causes either the reel 34 or 40 to be driven to take the tape up out of the associated loop chamber. In the event that the tape loop within either of the loop chambers 22 or 24 is up near the top of the associated loop chamber, the associated reels will be rendered operative to feed tape into the associated loop chambers so as to move the tape loop down into the chamber.

As the tape is being moved in and out of the loop chambers 22 and 24 by way of the driving of the reels 34 and 40, the tape will be fed over the guide rollers 30 and 32, and 36 and 38. Due to the sub-atmospheric pressure acting below the tape loops within the chambers 22 and 24, the tape is maintained under tension as it passes over the respective rollers so that the tape is maintained in substantially a straight line. As the tape is being moved over these rollers, the vacuum heads 42 and 44 serve to clean the tape and remove from the surface thereof any plastic dust or other particles that may have been generated and deposited thereon during the data transfer operation and the driving of the tape by way of the apparatus 12. This vacuum-cleaning operation will take place on the tape whether it is being fed from the reel or taken up on the reel. This arrangement thus serves to keep the dust and other unwanted materials from accumulating on the tape as it is fed up onto the reel, where it might become imbedded in the tape as more tape is wound on the reel, or under the transfer head 20.

Figure 2:
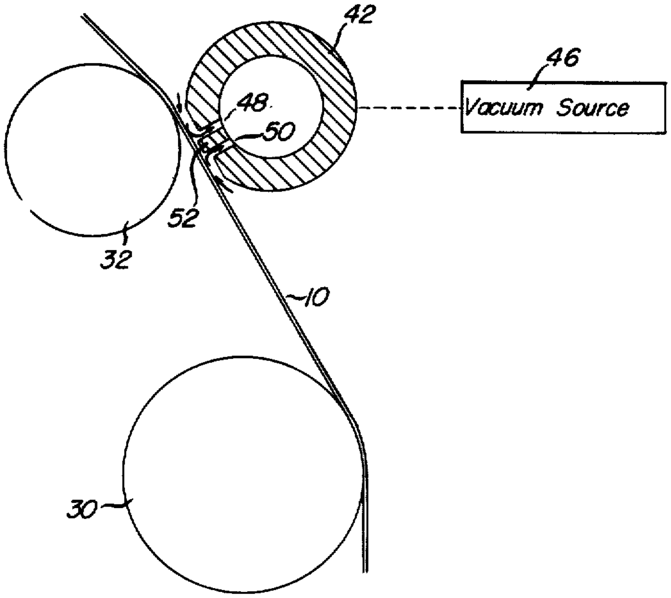
FIGURE 2 illustrates in expanded detail a cross-sectional view of the cleaning head of the apparatus.

Reefrring next to FIGURE 2, there is here illustrated in expanded detail the relative position of the cleaning head 42 with respect to the guide rollers 30 and 32, as well as the tape 10. It will be noticed in this figure that the tape 10, in passing over the rollers 30 and 32, is maintained under tension so that the tape, for all practical purposes, is in a straight line running between the peripheral surfaces of the two rollers 30 and 32. The cleaning head 42 is positioned close to, but not immediately adjacent, the roller 32. The positioning of the head 42 is somewhat critical for the reason that the head 42 should not be influenced by any lateral displacement of the tape 10 as driving forces are coupled thereto at one end or the other. Further, the head 42 should not be placed immediately adjacent the roller 32 as the appearance of a relatively large foreign particle on the tape might tend to cause the particle to be depressed into the surface of the tape if the tape could not move laterally under the head 42. Also, the head 42 should be displaced from the roller 32 so as not to interfere with the manual threading or loading of tape in the apparatus.

The cleaning head 42 is shown in cross-sectional detail and as shown takes the form of a hollow cylindrical member to which a vacuum source 46 may be coupled. The surface of the head 42, in the vicinity of the tape 10, is arcuate in nature and cut in the surface of this arcuate portion are a pair of longitudinal slots 48 and 50 separated by a land 52. The length of each of the slots 48 and 50 is preferably the same as the width of the tape 10 which is associated therewith. The said slots lie in parallel planes that are at right angles to the path of travel of the tape. The land 52 between the slots 48 and 50 serves two basic functions. The first function is that of preventing the tape 10 from moving, by way of lateral motion, across the slots 48 and 50 where the tape might tend to seal off the slots and thereby cause a braking action on the tape and other deleterious effects. The second function of the land 52 is to act as a projection which will, in effect, prevent any relatively large objects or foreign material from being carried on the surface of the tape 10 up onto the reel.

It will be apparent that with a vacuum coupled to the hollow portion of the member 42, air will be induced to flow to the slots 48 and 50 and the resultant air flow will tend to perform a vacuum-cleaning function on the surface of the tape 10.

The cleaning head 42 is shown, in FIGURE 2, to have the outer edges of the slots 48 and 50, away from the land 52, cut down. This cutting down of these outer edges serves to eliminate any sharp edges which might otherwise project toward the tape and cause unwanted abrading effects in the event the tape should be moved against the cleaning head at any time. Further, the edges exposed on the land area 52 are preferably rounded or finished in such a manner that there is no sharp edge which could cause any unwanted abrading effects on the tape. The flat areas on the surfaces of the cleaning head immediately adjacent each of the slots on the side opposite the land area are parallel with the tape surface and form therewith a passage through which air may flow into an associated slot.

Figure 3:
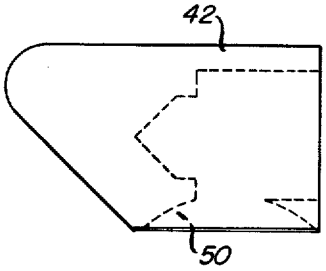
FIGURE 3 shows a side view of the cleaning head of the present apparatus.

As illustrated in the side view of the head 42 in FIGURE 3, the head 42 has the slot 50 therein, shown by dotted lines, coupled to an inner hollow portion thereof, also shown by dotted lines. The cutting of the slot 50 may be by way of a circular milling-type cutter. The outer end of the cleaning head 42 is shown with an offcentered projection which may readily serve to facilitate the loading of the tape onto the associated apparatus illustrated in FIGURE 1.

It will be readily apparent from the foregoing that there is here illustrated and described an apparatus which serves to clean by vacuum means an associated record tape. The effectiveness of this apparatus has been proven by the fact that an apparatus of the type illustrated in FIGURE 1, without incorporation of the present invention thereon, required the attention of the service engineer approximately every eight hours using a fairly rigorous cleaning program. With the addition of the teachings of the present invention to the apparatus, the cleaning operation required of a service engineer was reduced to less than one-tenth of that previously experienced. Further, the useful life of the associated tape has been considerably extended. The total end result is an apparatus which has considerably extended the time that error-free operation can be expected and the cost of maintaining the apparatus has been considerably reduced.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus for cleaning a magnetic tape as it is carried by a tape transport comprising a cleaning head positioned immediately adjacent to the oxide side of the tape but spaced therefrom, said cleaning head comprising a hollow cylindrical member having a pair of adjacent parallel slots cut in the surface thereof and communicating with the interior thereof, each slot having the open surface positioned at right angles to the path of travel of the tape and the cut positioned to be perpendicular to the surface of the tape and with the land area between the slots forming a mechanical buffer positioned closest to said tape to prevent the tape from covering said slots, said cylindrical member having the surface immediately adjacent each of said slots on the side opposite said land area cut away to form a flat surface parallel to the tape surface, and a vacuum source coupled to said member to cause a cleaning flow of air to pass over the tape and through said slots.

2. Apparatus for cleaning a magnetic tape as it is carried by a tape transport comprising a cleaning head positioned immediately adjacent to the oxide side of the tape but spaced therefrom, said cleaning head comprising a hollow cylindrical member having a pair of adjacent parallel slots cut in the surface thereof and communicating with the interior thereof, each slot having the open surface positioned at right angles to the path of the tape and the cut positioned to be perpendicular to the surface of the tape and with the land area between the slots forming a mechanical buffer, said buffer having rounded edges and being positioned closest to the tape to prevent the tape from covering said slots, said cylindrical member further having the surface immediately adjacent each of said slots, on the side opposite said land area, cut away to form a recessed surface area each constituting one of a pair of substantially parallel sides of a passage formed with said tape along which air may flow from points external to said head into the associated slot, said cleaning head being further positioned so that the openings for each of said slots are spaced from said tape by an equal distance, and a vacuum source coupled to said member to cause a cleaning flow of air to pass through said passage, when the tape is in position, and through said slots.

References Cited by the Examiner

UNITED STATES PATENTS

| | | | |
|---|---|---|---|
| 850,909 | 4/07 | Diserens | 15—401 |
| 1,608,202 | 11/26 | Compton | 162—374 |
| 1,832,844 | 11/31 | Cofrin | 162—374 X |
| 2,792,587 | 5/57 | Rose et al. | 15—307 |
| 2,818,595 | 1/58 | Rosewall | 15—306.1 |
| 3,035,295 | 5/62 | Buslik et al. | 15—100 X |
| 3,091,794 | 6/63 | Pillsbury | 15—308 |

FOREIGN PATENTS

| | | |
|---|---|---|
| 143,971 | 10/51 | Australia. |
| 488,360 | 12/29 | Germany. |

CHARLES A. WILLMUTH, *Primary Examiner.*